United States Patent

[11] 3,607,418

| [72] | Inventors | Alfred Ortlieb<br>Stuttgart-Vaihingen;<br>Gunter Schnepf, Stuttgart-bad, Cannstatt,<br>both of Germany |
| --- | --- | --- |
| [21] | Appl. No. | 804,778 |
| [22] | Filed | Mar. 6, 1969 |
| [45] | Patented | Sept. 21, 1971 |
| [73] | Assignee | Robert Bosch GmbH<br>Stuttgart, Germany |
| [32] | Priority | Mar. 19, 1968 |
| [33] | | Germany |
| [31] | | P 16 71 728.5 |

[54] FUEL CELL
9 Claims, 4 Drawing Figs.

| [52] | U.S. Cl. | 136/86 R |
| --- | --- | --- |
| [51] | Int. Cl. | H01m 27/02 |
| [50] | Field of Search | 136/86, 74, 79, 63; 204/286 |

[56] References Cited
UNITED STATES PATENTS
3,188,242 6/1965 Kordesch et al. ............ 136/86

FOREIGN PATENTS
| 13,960 | 1898 | Great Britain ............... | 136/74 |
| --- | --- | --- | --- |
| 2,062 | 1910 | Great Britain ............... | 136/63 |

Primary Examiner—Allen B. Curtis
Attorney—Michael S. Striker

ABSTRACT: A fuel cell wherein an electrically insulating annular holder of natural or synthetic rubber comprises inwardly extending collars provided with sealing lips which engage marginal portions of disk-shaped oxygen and fuel electrodes which define between themselves oxygen and fuel chambers. The oxygen chamber receives oxygen and discharges residues through partly radial and partly axially parallel inlets and outlets of the holder. Similar inlets and outlets are provided in the holder for admission of fuel and electrolyte into and for evacuation of combustion products from the combustion chamber. The outlets and inlets are surrounded by annular sealing lips provided on one end face of the holder and arranged to abut against the other end face of an adjoining holder so that the inlets and outlets of one holder communicate with the corresponding inlets and outlets of the adjoining holder but are sealed from the atmosphere.

PATENTED SEP 21 1971 3,607,418
FIG. 2 FIG. 1
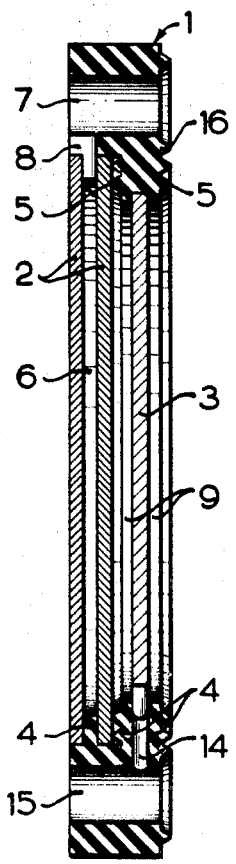
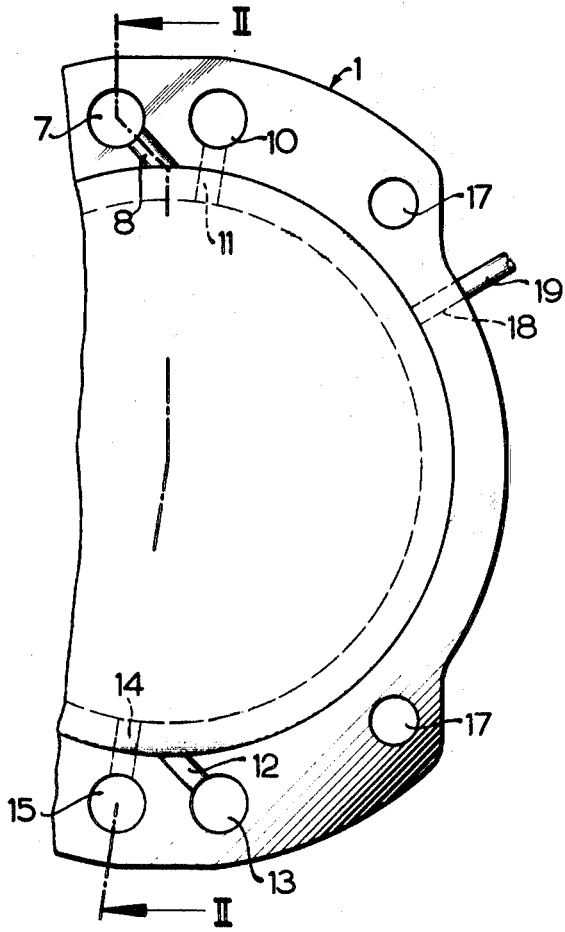
FIG. 3 FIG. 4
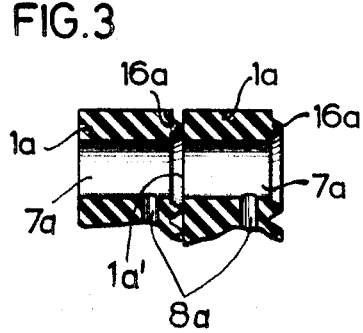
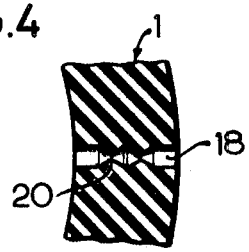
INVENTORS
Alfred ORTLIEB
Günter SCHNEPF
By
their ATTORNEY

FUEL CELL

BACKGROUND OF THE INVENTION

The present invention relates to fuel cells in general, and more particularly to improvements in holders for the electrodes and partitions of fuel cells.

It is already known to assemble fuel cells by means of tension rods which press a stack of electrode holders against each other. Each electrode is installed in a separate holder and the means for establishing seals between the holders of adjoining electrodes normally includes annular gaskets of electrically insulating material, so-called O-rings. Such rings are deformed in response to proper application of tension rods. A drawback of just described fuel cells is that they are too expensive due to the large number of components and that their assembly consumes much time.

It is also known to provide the electrodes of fuel cells with annular framelike holders of synthetic material which are applied thereto by injection molding, pressing, casting, glueing, sintering or another known procedure. Such cells, too, are quite expensive because the application of holders to individual electrodes consumes much time and must be performed in complicated and costly machinery. Furthermore, when the cells are in use and the holders are exposed to temperatures which vary within a wide range, the differences in heat expansion coefficients of parts of the cells generate excessive mechanical stresses. It was also noted that the holders undergo permanent deformation due to cold flow of their material in response to application of pressure by way of tension rods.

SUMMARY OF THE INVENTION

An object of our invention is to provide a novel and improved holder for the electrodes of fuel cells and to construct and design the holder in such a way that it permits rapid and convenient insertion of one or more electrodes.

Another object of the invention is to provide an electrode holder which can stand the fluctuations in temperature which develop when the fuel cell is in use.

A further object of the invention is to provide an electrode holder which requires little or no maintenance, which can properly support several electrodes of a fuel cell, and which can be readily assembled with similar holders to form a stack wherein the inlets and outlets for oxygen, fuel, electrolyte, residues and combustion products are properly sealed from the surrounding atmosphere and wherein the conductors which connect the electrodes with current conducting parts are sealed in a novel and improved way.

An additional object of the invention is to provide an electrode holder for fuel cells whose material is selected in such a way that it does not undergo permanent deformation in response to application of pressures which are needed to maintain the holders of adjoining cells in sealing engagement with each other.

The improved fuel cell comprises a plurality of platelike (preferably disk-shaped) members which include one or more electrodes and partitions and are preferably located in parallel planes closely adjacent to each other, and an annular holder of electrically insulating elastomeric material (preferably natural or synthetic rubber with a Shore-A hardness of between 50 and 95) which surrounds the platelike members and comprises internal spacer collars having shoulders adjacent to the marginal portions of the members to maintain them in predetermined positions with reference to each other. The collars are preferably provided with annular sealing portions or lips which abut against the side faces of the corresponding platelike members.

The platelike members define with the holder several chambers which extend between such members and include an oxygen chamber and at least one combustion chamber. The oxygen chamber receives oxygen and discharges residues by way of discrete inlets and outlets provided in the holder. The combustion chamber receives fuel and electrolyte and discharges combustion products through discrete inlets and outlets provided in the holder. Each inlet and each outlet has a portion which extends between the two end faces of the holder and at least one end of each such portion is bounded by at least one annular sealing lip. When the holder is assembled with a similar holder by means of tension rods or analogous fasteners, the sealing lips on one end face of one holder bear against the other end face of the adjoining holder to seal the respective inlets and outlets from the atmosphere. Each inlet and each outlet of one holder registers with the corresponding inlet or outlet of the adjoining holder or holders.

The novel features which are considered as characteristic of the invention are set forth in particular in the appended claims. The improved electrode holder itself, however, both as to its construction and its mode of operation, together with additional features and advantage thereof, will be best understood upon perusal of the following detailed description of certain specific embodiments with reference to the accompanying drawing.

BRIEF DESCRIPTION OF THE DRAWING

FIG. 1 is a plan view of a portion of a fuel cell whose electrode holder is constructed in accordance with one form of our invention;

FIG. 2 is a sectional view as seen in the direction of arrows from the line II—II of FIG. 1;

FIG. 3 is a fragmentary sectional view of holders in two adjoining fuel cells; and FIG. 4 is a fragmentary sectional view of a detail in the structure shown in FIG. 1.

DESCRIPTION OF THE PREFERRED EMBODIMENTS

Referring to FIGS. 1 and 2, there is shown an annular one-piece holder 1 which surrounds three parallel or substantially parallel platelike members including two disk-shaped oxygen electrodes 2 and a disk-shaped fuel electrode or partition 3. The holder 1 consists of elastomeric material and has inwardly extending annular collars 4 which surround the marginal portions of electrodes 2 and 3. The material of the holder is an insulator, preferably a synthetic or natural rubber, for example, ethylene-propylene rubber or sulfochlorinated polyethylene known under the trade name "Hypalon". Its Shore-A hardness is preferably between 50 and 95 . The collars 4 are provided with sealing portions or lips 5 in regions where the electrode 3 must be sealed from the adjoining inner electrode 2 and where the electrode 3 must be sealed from the outer electrode 2 of an adjoining cell, not shown. In order to facilitate the mounting of electrodes 2 and 3, they are preferably of different diameters. As shown, the diameters of electrodes 2 exceed the diameter of the electrode 3. During assembly, the smaller diameter electrode 3 is inserted in the first step so that such insertion is not interfered with by the collars 4 and lips 5 for the larger diameter electrodes.

The electrodes 2 define between themselves and with the holder 1 an oxygen chamber 6 which receives oxygen by way of an inlet including radially and axially extending portions 7 and 8 provided in the holder 1. The residues are evacuated from oxygen chamber 6 by way of an outlet including substantially radially and axially extending portions 12 and 13 shown in FIG. 1. The two-piece combustion chamber 9 accommodates the electrode 3 and receives electrolyte and fuel by way of an inlet including portions 10 and 11 provided in the holder 1. The reaction products escape from the combustion chamber 9 by way of an outlet including portions 14, 15 provided in the holder 1. The inlet portions 7, 10 and outlet portions 13, 15 extend in parallelism with the axis of and between the end faces of the holder 1 and at least one end of each of these portions is surrounded by an annular sealing lip 16. The planes of such sealing lips 16 are parallel to the planes of the electrodes 2 and 3. When the cell including the structure of FIGS. 1 and 2 is assembled with one or more additional cells by way of customary tension rods (not shown) or analogous fasteners which are introduced through apertures 17 of the holder 1, one end face of the holder of one cell bears against and deforms the lips 16 of the adjoining cell to thus provide a very satisfactory sealing action.

FIG. 3 illustrates portions of two adjoining holders 1a each of which forms part of a discrete fuel cell. The flat end face 1a' of the right-hand holder 1a bears against the annular lip 16a of the left-hand holder 1a to thereby seal the region where the inlet portions 7a of the two holders are adjacent to each other. The numerals 8a denote the radial portions of inlets which admit oxygen to the oxygen chambers of the respective cells.

Referring to FIGS. 1 and 4, there is shown a radially extending channel 18 which is formed in the holder 1 for passage of a conductor 19 which is connected with one of the electrodes, for example, with one of the oxygen electrodes 2. The internal surface of the holder 1 around the channel 18 is formed with one or more annular sealing lips 20 which are in sealing engagement with the conductor 19 to insure that the interior of the chamber 6 is properly sealed from the surrounding atmosphere. The internal diameter of each lip 20 and/or the external diameter of the corresponding conductor 19 is selected in such a way that each lip undergoes at least some deformation when the conductor is passed through the channel 18.

Without further analysis, the foregoing will so fully reveal the gist of the present invention that others can by applying current knowledge, readily adapt it for various applications without omitting features which fairly constitute essential characteristics of the generic and specific aspects of our contribution to the art.

What is claimed as new and desired to be protected by Letters Patent is set forth in the appended

1. In a fuel cell, a combination comprising a plurality of substantially platelike members; and an annular holder consisting of electrically insulating material surrounding said members and having substantially ring-shaped internal spacer collars adjacent to marginal portions of said members so as to maintain said members in a predetermined position with reference to each other, at least some of said collars are provided with annular sealing portions abutting against the corresponding members the spacer collars being so constructed to permit insertion of said members into said holder.

2. A combination as defined in claim 1, wherein said holder consists of elastomeric material.

3. A combination as defined in claim 2, wherein said elastomeric material is natural rubber.

4. A combination as defined in claim 2, wherein said elastomeric material is a synthetic rubber.

5. A combination as defined in claim 2, wherein said elastomeric material has a Shore-A hardness of between 50 and 95.

6. A combination as defined in claim 1 wherein said members include a partition and at least one electrode.

7. A combination as defined in claim 6, wherein said members define with said holder a plurality of chambers extending between said members and wherein said holder is provided with an inlet and an outlet for each of said chambers.

8. A combination as defined in claim 7, wherein said holder has two end faces at least one of which is substantially parallel with the planes of said members and wherein said inlets and outlets have portions extending between said end faces, said one end face being provided with annular sealing lips each surrounding one of said portions.

9. In a fuel cell, a combination comprising a plurality of substantially platelike members; an annular holder surrounding said members and having a substantially ring-shaped internal spacer collars adjacent to marginal portions of said members so as to maintain said members in predetermined positions with reference to each other, said holder consisting of electrically insulating material and being provided with at least one channel; electrical conductor means extending through said channel and connected to one of said members; and at least one annular lip in said channel integral with said holder and sealingly engaging said conductor means the spacer collars being so constructed to permit insertion of said members into said holder.